US012223495B2

(12) United States Patent
Khan et al.

(10) Patent No.: US 12,223,495 B2
(45) Date of Patent: *Feb. 11, 2025

(54) VALUE ADDED SERVICES POLLING

(71) Applicant: Apple Inc., Cupertino, CA (US)

(72) Inventors: Ahmer Ali Khan, Milpitas, CA (US); Brian J. Tucker, Sunnyvale, CA (US); Ho Cheung Chung, Sunnyvale, CA (US); Joakim Linde, Palo Alto, CA (US); Zachary A. Rosen, San Francisco, CA (US); Gordon Y. Scott, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/806,466

(22) Filed: Jun. 10, 2022

(65) Prior Publication Data

US 2022/0374868 A1 Nov. 24, 2022

Related U.S. Application Data

(63) Continuation of application No. 15/170,724, filed on Jun. 1, 2016, now Pat. No. 11,373,168.

(Continued)

(51) Int. Cl.
*G06Q 30/00* (2023.01)
*G06Q 20/20* (2012.01)
(Continued)

(52) U.S. Cl.
CPC ......... *G06Q 20/353* (2013.01); *G06Q 20/204* (2013.01); *G06Q 20/3278* (2013.01); *G06Q 30/0226* (2013.01)

(58) Field of Classification Search
CPC ............. G06Q 20/353; G06Q 20/3278; G06Q 20/204; G06Q 30/0226; G06Q 20/327
See application file for complete search history.

(56) References Cited

U.S. PATENT DOCUMENTS 6,253,269 B1    6/2001  Cranston et al.
8,534,564 B2 *  9/2013  Hammad ............... G06Q 20/12
                                              235/487

(Continued)

FOREIGN PATENT DOCUMENTS

CN    102982456 A  *  3/2013  ............. G06Q 30/00
EP       2745250 A4 *  1/2015  ............. G06Q 30/06

(Continued)

OTHER PUBLICATIONS

GSMA. Value Added Services Applet Design Proposal Version 1.0. (Mar. 10, 2015). Retrieved online Jul. 27, 2021. https://nanopdf.com/queue/nfc19-value-added-services-applet-design-proposal_pdf?queue_id=-1&x=1627368675&z=MTUxLjlwNy4yNTAuMzU= (Year: 2015).*

(Continued)

*Primary Examiner* — James A Reagan
(74) *Attorney, Agent, or Firm* — DICKINSON WRIGHT RLLP

(57) ABSTRACT

Disclosed herein are systems, methods, and non-transitory computer-readable storage media for transmitting, as part of a polling loop, a value added services (VAS) command that includes capability data corresponding to a payment terminal. For example, the payment terminal can transmit a VAS command that advertises the payment terminal's capabilities as part of a polling loop. The payment terminal can listen for a response to the VAS command and, after receiving a response, the payment terminal may initiate a VAS protocol. The VAS command can also specify a mode in which the payment terminal is operating, such as a payment-only mode, a VAS mode, a payment-plus-VAS mode, etc.

20 Claims, 7 Drawing Sheets

Related U.S. Application Data

(60) Provisional application No. 62/171,851, filed on Jun. 5, 2015.

(51) Int. Cl.
*G06Q 20/32* (2012.01)
*G06Q 20/34* (2012.01)
*G06Q 30/0226* (2023.01)

(56) References Cited

U.S. PATENT DOCUMENTS

| | | | | |
|---|---|---|---|---|
| 8,630,192 | B2* | 1/2014 | Raleigh | H04W 12/37 370/252 |
| 9,317,848 | B2* | 4/2016 | Hammad | H04L 9/3234 |
| 9,477,313 | B2* | 10/2016 | Mistry | G06F 3/017 |
| 9,609,474 | B2* | 3/2017 | Huang | H04W 4/029 |
| 11,373,168 | B2* | 6/2022 | Khan | G06Q 20/353 |
| 2005/0048929 | A1* | 3/2005 | Ogino | G08C 17/00 455/90.1 |
| 2005/0226201 | A1* | 10/2005 | McMillin | H04W 88/04 370/348 |
| 2006/0173781 | A1* | 8/2006 | Donner | G06Q 30/0268 705/50 |
| 2008/0165003 | A1* | 7/2008 | Graichen | H04L 1/0071 340/572.1 |
| 2011/0078081 | A1* | 3/2011 | Pirzadeh | H04L 12/14 705/44 |
| 2011/0112918 | A1* | 5/2011 | Mestre | G06Q 20/349 705/16 |
| 2012/0031969 | A1* | 2/2012 | Hammad | G06Q 20/40 235/380 |
| 2013/0040571 | A1* | 2/2013 | Wall | G06Q 20/20 455/41.1 |
| 2013/0046643 | A1* | 2/2013 | Wall | G06Q 20/3278 705/16 |
| 2013/0057390 | A1* | 3/2013 | Watt | G06K 19/0717 235/492 |
| 2013/0080219 | A1* | 3/2013 | Royyuru | G06Q 30/00 705/14.1 |
| 2013/0317924 | A1* | 11/2013 | Bush | H04W 4/80 705/16 |
| 2014/0139454 | A1* | 5/2014 | Mistry | G06F 3/017 345/173 |
| 2014/0143784 | A1* | 5/2014 | Mistry | G06F 3/0488 718/102 |
| 2014/0207556 | A1* | 7/2014 | Hertel | G06Q 30/0238 705/14.38 |
| 2014/0323051 | A1* | 10/2014 | Hertel | H04B 5/0068 455/41.2 |
| 2014/0355517 | A1* | 12/2014 | Reunamaki | H04W 8/005 370/328 |
| 2014/0361728 | A1* | 12/2014 | Qian | H02J 50/40 320/106 |
| 2014/0361735 | A1* | 12/2014 | Li | H02J 50/12 320/108 |
| 2015/0073953 | A1* | 3/2015 | Springer | G06Q 20/343 705/30 |
| 2015/0181621 | A1* | 6/2015 | Levy | H04B 5/0031 455/41.1 |
| 2015/0276237 | A1* | 10/2015 | Daniels | F24D 19/10 237/2 A |
| 2015/0276238 | A1* | 10/2015 | Matsuoka | F24F 11/00 700/278 |
| 2015/0276239 | A1* | 10/2015 | Fadell | H04L 12/6418 236/51 |
| 2015/0276266 | A1* | 10/2015 | Warren | F24D 19/1081 700/300 |
| 2015/0332031 | A1* | 11/2015 | Mistry | H04W 12/06 726/19 |
| 2016/0227360 | A1* | 8/2016 | Huang | H04W 4/02 |
| 2016/0248479 | A1* | 8/2016 | Bellenger | H04B 5/0031 |
| 2016/0307189 | A1* | 10/2016 | Zarakas | G06K 19/07722 |
| 2016/0358159 | A1 | 12/2016 | Khan et al. | |
| 2018/0089690 | A1 | 3/2018 | Wan et al. | |

FOREIGN PATENT DOCUMENTS

| | | | | |
|---|---|---|---|---|
| WO | WO-2012126228 A2 * | 9/2012 | | H04L 41/022 |
| WO | WO-2016007999 A1 * | 1/2016 | | G06Q 30/02 |

OTHER PUBLICATIONS

Abdulkareem Aljohani.A Unified Mobile Payment Transaction Exchange Service (UMTES) for Next-Generation Mobile Networks. (Sep. 2014). Retrieved online Nov. 16, 2021. https://pure.southwales.ac.uk/files/3433790/Aljohani_Thesis_28_9_2014.pdf(Year: 2014).*

* cited by examiner

189

| b8 | b7 | b6 | b5 | b4 | b3 | b2 | b1 | DESCRIPTION |
|----|----|----|----|----|----|----|----|-------------|
| -  | -  | -  | -  | -  | -  | 0  | 1  | TERMINAL IN VAS APP + PAYMENT MODE |
| -  | -  | -  | -  | -  | -  | 1  | 0  | TERMINAL IN VAS APP ONLY MODE |
| -  | -  | -  | -  | -  | -  | 1  | 1  | TERMINAL IN PAYMENT MODE ONLY |
| 0  | 0  | 0  | 0  | 0  | 0  | X  | X  | BITS b7-b3 SHALL BE SET TO 0 |
|    |    |    |    |    |    |    |    | ALL OTHER VALUES ARE RFU |

FIG. 1C

VALUE ADDED SERVICES POLLING

CROSS-REFERENCE TO RELATED APPLICATION

This application is a continuation of U.S. patent application Ser. No. 15/170,724, entitled "VALUE ADDED SERVICES POLLING," filed Jun. 1, 2016, set to issue Jun. 28, 2022 as U.S. Pat. No. 11,373,168, which claims priority to U.S. Provisional Patent Application No. 62/171,851, entitled "VALUE ADDED SERVICES POLLING," filed Jun. 5, 2015, the contents of all of which are incorporated by reference herein in their entirety for all purposes.

FIELD

The present disclosure relates to short-range communications between an object and a terminal, including to a near field communication terminal that can inform a communication device of enabled features.

BACKGROUND

Existing near-field communication (NFC) payment terminals operate according to a standard provided by Europay, MasterCard, Visa (EMVCo). This standard involves a Layer 1 transaction wherein the reader executes a polling loop that advertises available communication protocols, and when one of those advertisements is responded to, performs a handshake between the NFC terminal and a portable communication device. The standard also includes a Level 2 transaction wherein a specific payment-processing kernel is executed (e.g., Visa, MasterCard, Amex, etc.).

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for transmitting, as part of a polling loop, a value added services (VAS) command that includes capability data for the payment terminal.

In some embodiments of the present technology, a payment terminal can transmit a VAS command that advertises the payment terminal's capabilities as part of a polling loop. The payment terminal can listen for a response to the VAS command and, after receiving a response, the payment terminal can initiate a VAS protocol. The VAS command can also specify a current or present mode in which the payment terminal is operating. For example, the payment terminal can be currently operating in a payment-only mode, a VAS mode, a payment-plus-VAS mode, etc.

In some embodiments, the payment terminal can store instructions including Level 1 polling instructions and Level 2 instructions effective to transmit and receive communications according to one of a plurality of protocols that includes a VAS protocol. The instructions can cause the payment terminal to directly enter the VAS protocol upon initiation of the Level 2 instructions.

In some embodiments a communication device can receive a VAS command from a payment terminal and can detect the payment terminal capabilities data that was transmitted within the VAS command. Based at least in part on the detected payment terminal capabilities data, the communication device can prepare to initiate a transaction with the payment terminal and can initiate a transaction with the payment terminal by responding to the VAS command. For example, preparing to initiate a transaction with the payment terminal can include configuring the communication device to operate in accordance with an appropriate VAS protocol that corresponds to the VAS command.

BRIEF DESCRIPTION OF THE DRAWINGS

In order to describe the manner in which the above-recited features, and other advantages and features, of the disclosure can be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1C illustrates an example of information transmitted by the VAS-Up kernel;

DETAILED DESCRIPTION

Figure 1A:
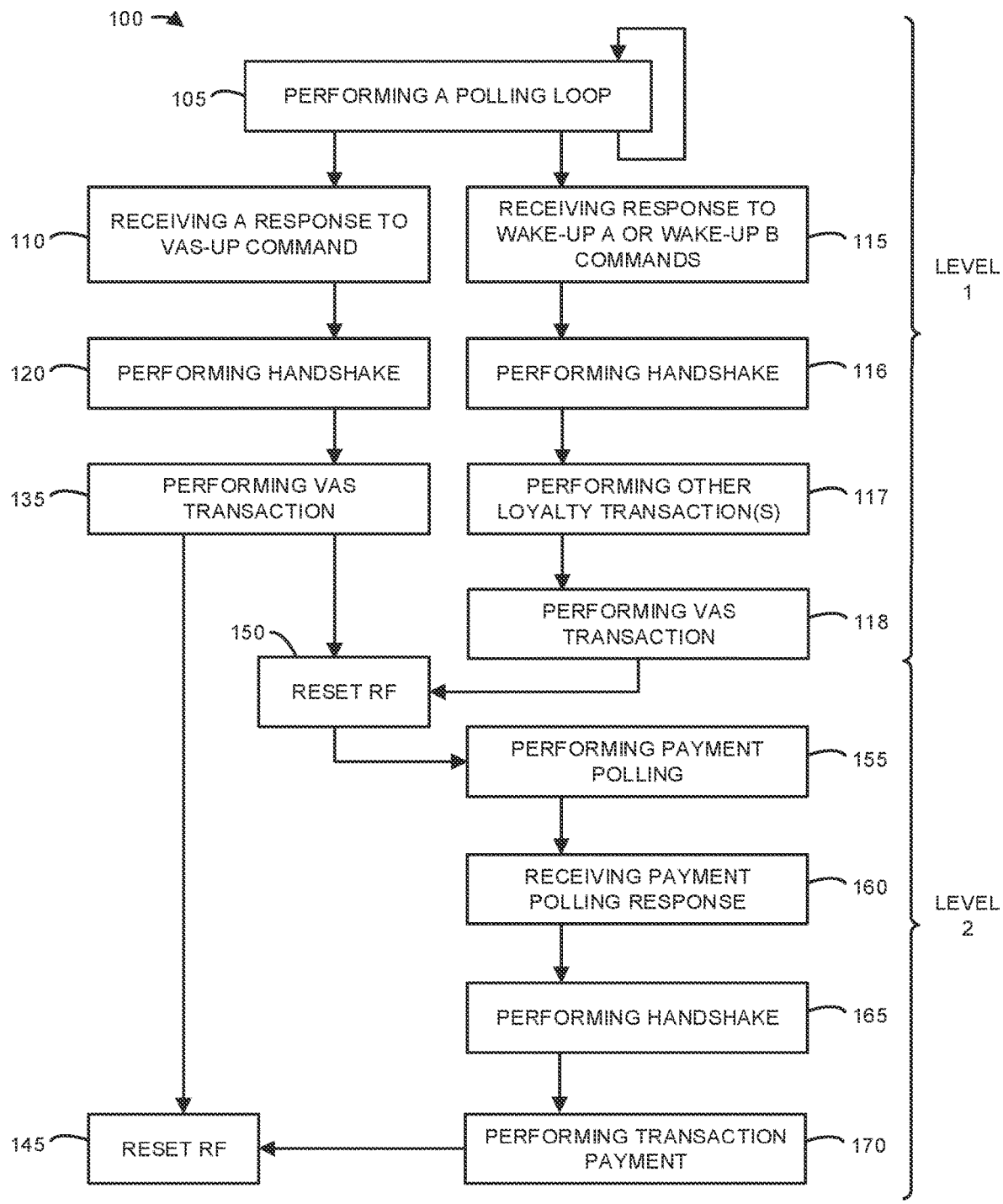
FIG. 1A illustrates an example method of polling for devices that have value added services (VAS) capabilities.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for a payment terminal having the ability to perform a polling loop to communicate its capabilities to other communication devices. Systems, methods and non-transitory computer-readable media are disclosed which transmit, as part of a polling loop, a value added services (VAS) command that includes capability data for the payment terminal. Also, systems, methods, and non-transitory computer-readable media are disclosed which receive and respond to a VAS command that includes capability data for the payment terminal.

Payment terminals can communicate with an electronic device using a contactless communication interface and a radio link with a contactless communication interface of the electronic device. For example, a payment terminal can use near field communication (NFC) technology to communicate with an NFC-enabled device, e.g., having a storage medium that contains encrypted payment information. According to the present technology, the payment terminal can also be configured to perform one or more additional value added services. For example, in addition to storing payment information, an electronic device can store information relating to one or more consumer loyalty programs. A consumer loyalty program can provide advantages to a consumer, such as affecting a price of an item, resulting in the accrual of loyalty points, trigger special offers, etc.

Payment terminals can also operate in a variety of modes depending on a number of factors including the type of transaction, the type of merchant, a customer preference, etc. For example, in some cases, a payment terminal can be in a VAS-only mode and can perform VAS-only transactions (e.g., determining whether the consumer is entitled to redeem a loyalty reward) before subsequently processing a payment. Also, a terminal can be in a VAS-plus-payment mode and can perform a VAS-transaction and a payment transaction in a single interaction, e.g., using a loyalty card to obtain deals and automatically processing a payment using a card linked with the loyalty program. In some cases, a payment terminal that is VAS-enabled can also operate in a Payment-only mode.

As introduced above, there is a need for a payment terminal to be able to communicate its capabilities to an NFC-enabled device before a handshake between the payment terminal and the device. This allows the device communicating with the terminal to prepare to transmit the appropriate VAS information and/or payment information, depending on whether the payment terminal supports VAS transactions and depending on the mode in which the payment terminal is operating. Accordingly, some embodiments of the present technology introduce a VAS command that also includes a message advertising the payment terminal's capabilities into the payment terminal's polling loop. The VAS command can be read by a payment device, but a handshake with the payment device may not be initiated until the payment device responds to the VAS command. By causing the terminal to wait for a response to the VAS command, the electronic device may be able to prepare to perform a VAS transaction with the payment terminal according to the mode in which the payment terminal is operating. FIG. 1 illustrates an example method 100 of polling for devices that have VAS capabilities, according to some embodiments of the present technology.

As illustrated in FIG. 1A, the method can progress through two levels, Level 1 and Level 2. In some embodiments these levels can correspond to a standard established by EMVCo for processing payment transactions using an NFC card reader and an NFC-enabled payment object. The EMVCo standard sets forth that, in Level 1, a payment terminal can advertise communication protocols supported by the card reader in a polling loop. These protocols can be advertised as commands, such as a Wake-Up-A command or Wake-Up-B command, corresponding to communication protocols A & B, respectively. Other protocols, such as Type-F (of FeliCa) also can be supported. Once a card or other NFC-enabled object responds to one of the advertised communication protocols, the card reader and NFC-enabled object may initiate a communication session using the communication protocol that is designated in the advertised command. The EMVCo standard sets forth that, in Level 2, one or more payment kernels can be advertised, e.g., kernels for Visa, MasterCard, AMEX, etc. The NFC-enabled object can respond to the advertisement corresponding to the issuer of the payment object that is to be used in the transaction.

The present technology can work within existing standards, but can add an additional advertisement to the Level 1 polling loop, herein called a VAS-Up command or VAS command. The VAS-Up command can utilize an existing communication protocol, such as communication protocol Type-A (or Type-B or Type-F), but also include additional data. An NFC-enabled object that also supports VAS can respond to the VAS-Up command, if it is available. The present technology can also utilize a new kernel added to Level 2 for VAS.

The method 100 of FIG. 1A involves a payment terminal performing a polling loop 105 as part of Level 1 to advertise the type(s) of communication protocol(s) supported by the payment terminal. The polling loop can involve advertising a communication standard by transmitting commands using the advertised protocol(s) and listening for responses. A response can indicate that a device is trying to communicate with the payment terminal using the standard that was last advertised by the payment terminal. One example standard known to those of skill in the art, ISO14443, defines at least two communication standards—type A and type B. Additionally, as recognized by the present technology, further poll signals can be employed to communicate that the terminal has certain other capabilities. For example, a VAS-Up command can be used to specify that the terminal supports VAS. The VAS-Up command can also be used to specify a mode the terminal is operating in, e.g., VAS-only mode, VAS-plus-payment mode, payment only mode, etc.

The polling loop can iterate until an electronic device is brought into communication range, receives a command, and responds to the command to indicate that the electronic device understands a protocol used to communicate the command. For example, the polling loop can involve transmitting a Wake-Up A command, waiting for a predetermined period of time for a response, transmitting a Wake-Up B command, waiting for a predetermined period of time for a response, transmitting a VAS-Up command, waiting for a predetermined period of time for a response, and iterating the steps until a response is received. In other implementations, different sequences can be employed involving more, fewer, and/or different protocols, different transmissions, different periods, etc.

Figure 1B:
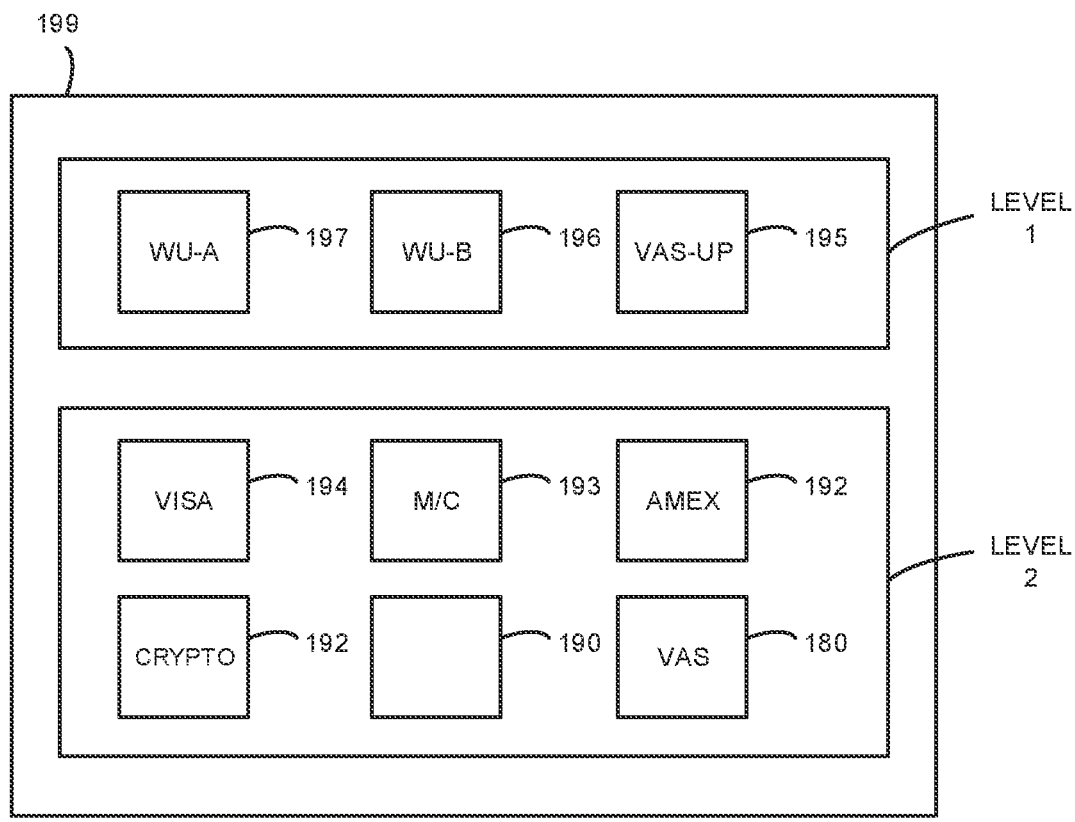
FIG. 1B illustrates an example of a payment terminal configured with Level 1 polling kernels and Level 2 payment kernels.

FIG. 1B illustrates an example of a payment terminal 199 configured with Level 1 polling commands and Level 2 payment kernels according to some embodiments of the present technology. The Level 1 polling commands can include a Wake-Up A command 197, a Wake-Up B command 196, and a VAS-Up command 195. In other implementations, more, fewer, or different polling commands can be used. The Level 2 payment kernels can include, for example, a VISA kernel 194, a MasterCard kernel 193, an American Express kernel 192, a crypto-currency kernel 191, and one or more further payment processing kernels 190 that are now known or developed later. In other implementations, more, fewer, or different payment kernels can be used.

The EMVCo standard can also involve certifying payment terminals before they are authorized to process a payment. In some embodiments of the present technology, the VAS-Up command 195 can be added to a certified payment terminal without the need to have the terminal re-certified by EMVCo. For example, the VAS-Up command 195 can be added to the payment terminal and the payment terminal can be configured to transmit a VAS-Up command having a standard ISO format with an extra byte that indicates that the payment terminal can perform VAS transactions and indicating the VAS mode in which the terminal is operating. Likewise, a VAS transaction command 180 can be added to the Level 2 kernels for performing Level 2 VAS transactions.

FIG. 1C illustrates an example of a byte 189 transmitted in the VAS-Up command 195. As illustrated, the byte 189 specifies the mode that the terminal is operating in, e.g., VAS-only mode, VAS-plus-payment mode, payment only mode, etc.

Referring again to FIG. 1A, Level 1 of the method 100 can involve receiving a response to the VAS-Up command 110 from a device 120 and performing a handshake with the device 120 to set up a VAS session. Additionally, Level 1 of the method 100 can involve receiving a response to the Wake-Up A or Wake-Up B commands 115, performing a handshake 116, performing one or more other loyalty transactions 117, performing a VAS transaction 118 and progressing to a Level 2 payment polling loop 155 as discussed below.

When a VAS session is set up, e.g., after receiving a response to the VAS-Up command 110 and performing a handshake with a device 120, method 100 may involve executing a VAS kernel as part of the Level 2 services. Executing a VAS kernel can involve transmitting a VAS identifier (e.g., a merchant identifier) to the electronic device, receiving VAS data (e.g., loyalty card information for a merchant associated with the merchant identifier) and performing a VAS transaction according to the mode in which the terminal is operating. (Note that a benefit of the terminal receiving a response to the VAS-UP command is that it can go directly to a VAS protocol and can bypass all 'other' loyalty protocols.)

When the terminal is in a VAS only mode, executing the VAS kernel 135 can involve performing a VAS transaction (e.g., determining that the customer is entitled to a free or discounted item) and resetting the communication field 145.

When the terminal is in a VAS-plus-payment mode, executing the VAS kernel 135 can involve performing a VAS transaction (e.g., applying a discount per a loyalty program), resetting the communication field 150, and progressing to a Level 2 payment polling loop 155.

The ISO14443 standard also specifies a Level 2 transaction in which a specific payment-processing kernel is executed (e.g., Visa, MasterCard, Amex, etc.). Accordingly, the payment polling loop 155 can involve polling the device with payment type commands corresponding to the supported payment-processing kernels. Note that method 100 may involve receiving a response to the payment polling command 160 and performing a handshake 165 to set up a payment session. Once the payment session is set up, method 100 can involve performing a payment transaction 170 and resetting the communication field 145.

Figure 2:
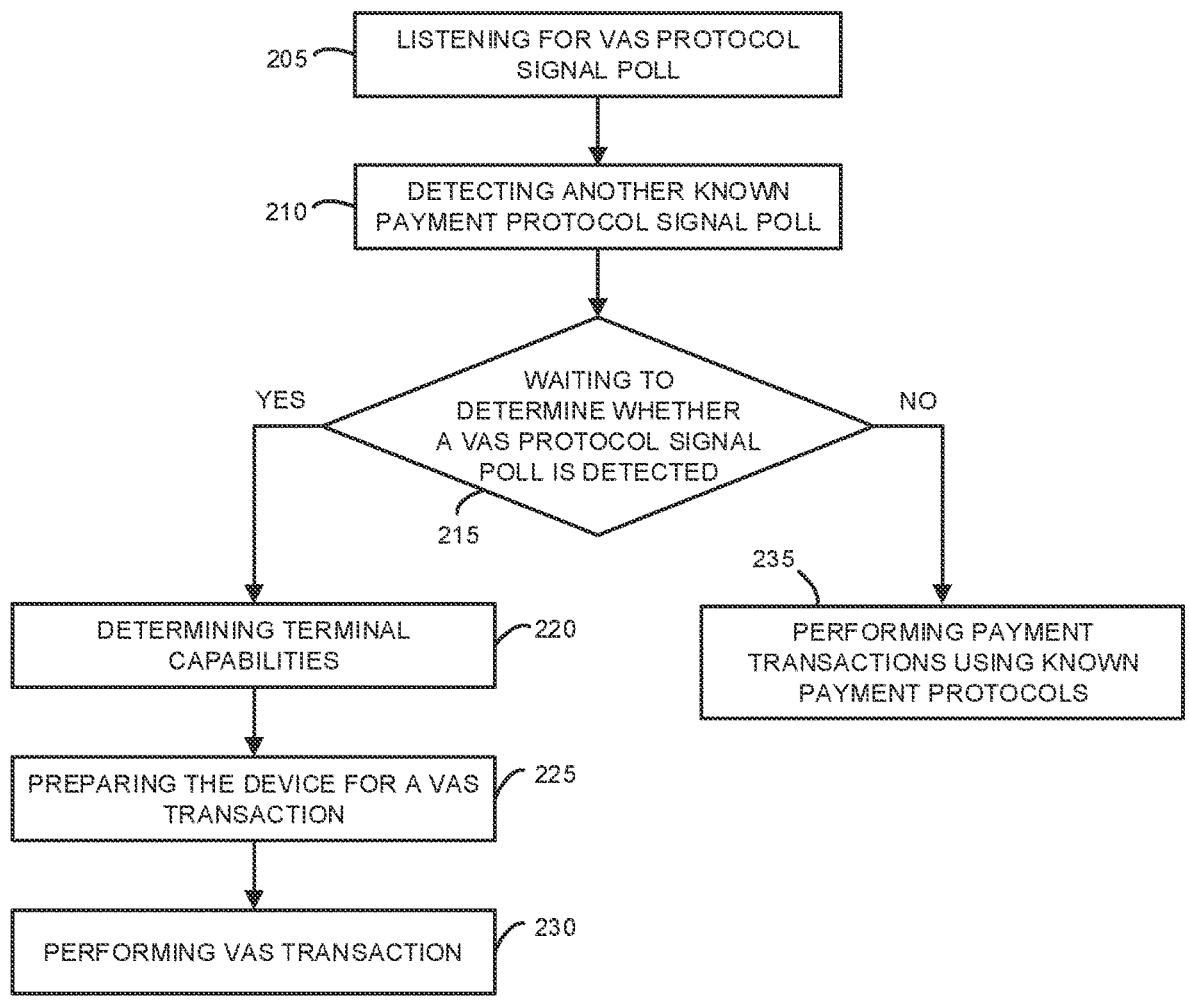
FIG. 2 illustrates an example method of waiting to determine whether a VAS-Up command is detected before initiating a payment transaction.

FIG. 2 illustrates an example of a method 200 in which an electronic device listens for a VAS-Up command 205, detects another known communication protocol command 210, and waits to determine whether a VAS-Up command is detected 215. For example, waiting to determine whether a VAS-Up command is detected 215 can involve receiving and not responding to one or more protocol commands until the VAS-Up command is detected or until the known communication protocol command is received a subsequent time (e.g., a second time) without having detected a VAS-Up command. For example, an electronic device can wait until it either receives a VAS-Up command or has observed at least one complete polling loop before responding. In another example, waiting to determine whether a VAS-Up command is detected 215 can involve waiting a predetermined period of time. In other examples, waiting to detect a VAS-Up command can include both waiting a predetermined period of time and detecting a known command at least twice.

When a VAS-Up command is detected, method 200 may involve determining the terminal's capabilities 220 based on data transmitted as part of the VAS-Up command (as shown in FIG. 1C for example) and preparing the device for a VAS transaction 225. For example, preparing the device for a VAS transaction can involve the device activating an application that stores VAS data, caching one or more frequently used VAS loyalty card, etc.

Next, the method involves performing a VAS transaction 230. When a VAS protocol signal is not detected, method 200 may involve performing a payment transaction using the known payment protocol 235. Note that the VAS transaction may be performed prior to the payment transaction.

Figure 3:
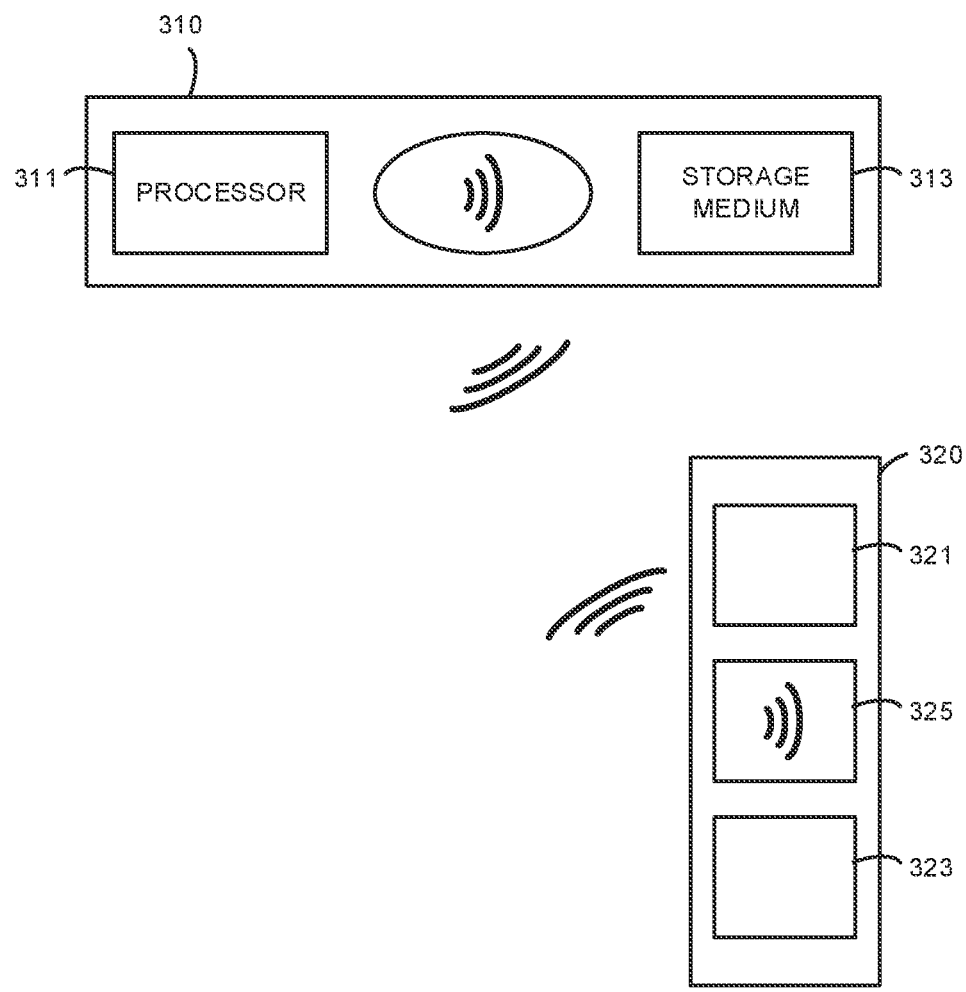
FIG. 3 illustrates a system for discovering a payment terminal's capabilities and performing a VAS transaction.

FIG. 3 illustrates an example of a system 300 for sending VAS commands between a payment terminal 310 and an electronic device 320, e.g., to discover the terminal's 310 and the device's 320 respective capabilities, as well as performing a VAS transaction according to some embodiments of the present technology. The payment terminal 310 includes a processor 311, a contactless communications interface 315, and a storage medium 313 having instructions stored thereon for performing a polling loop and for performing VAS and payment transactions. In some embodiments, the instructions cause the payment terminal to transmit VAS commands as part of the polling loop. The VAS commands can include a VAS protocol signal that specifies a mode that the payment terminal is operating in, e.g., VAS-only transaction mode, VAS-plus-payment transaction mode, etc.

Note that electronic device 320 can be any device configured to communicate with the contactless network interface 315. For example, electronic device 320 can be a phone, a smart phone, a wearable electronic device, a tablet computer, a notebook (or laptop) computer, any other such portable computing device, a programmable universal card, etc.

Moreover, electronic device 320 includes a processor 321, a communications interface 325, and a storage medium 323 having instructions stored thereon for detecting payment and VAS-Up commands, and for performing VAS and payment transactions. When electronic device 320 detects a known payment protocol signal poll, electronic device 320 can wait to determine whether a VAS-Up command is subsequently detected. If a VAS-Up command is detected, electronic device 320 can determine the payment terminal's 310 capabilities, prepare for a VAS transaction, and initiate a VAS transaction by responding to payment terminal 310 with a VAS protocol signal. Furthermore, electronic device 320 can perform the VAS transaction before performing a payment transaction.

Figure 4A:
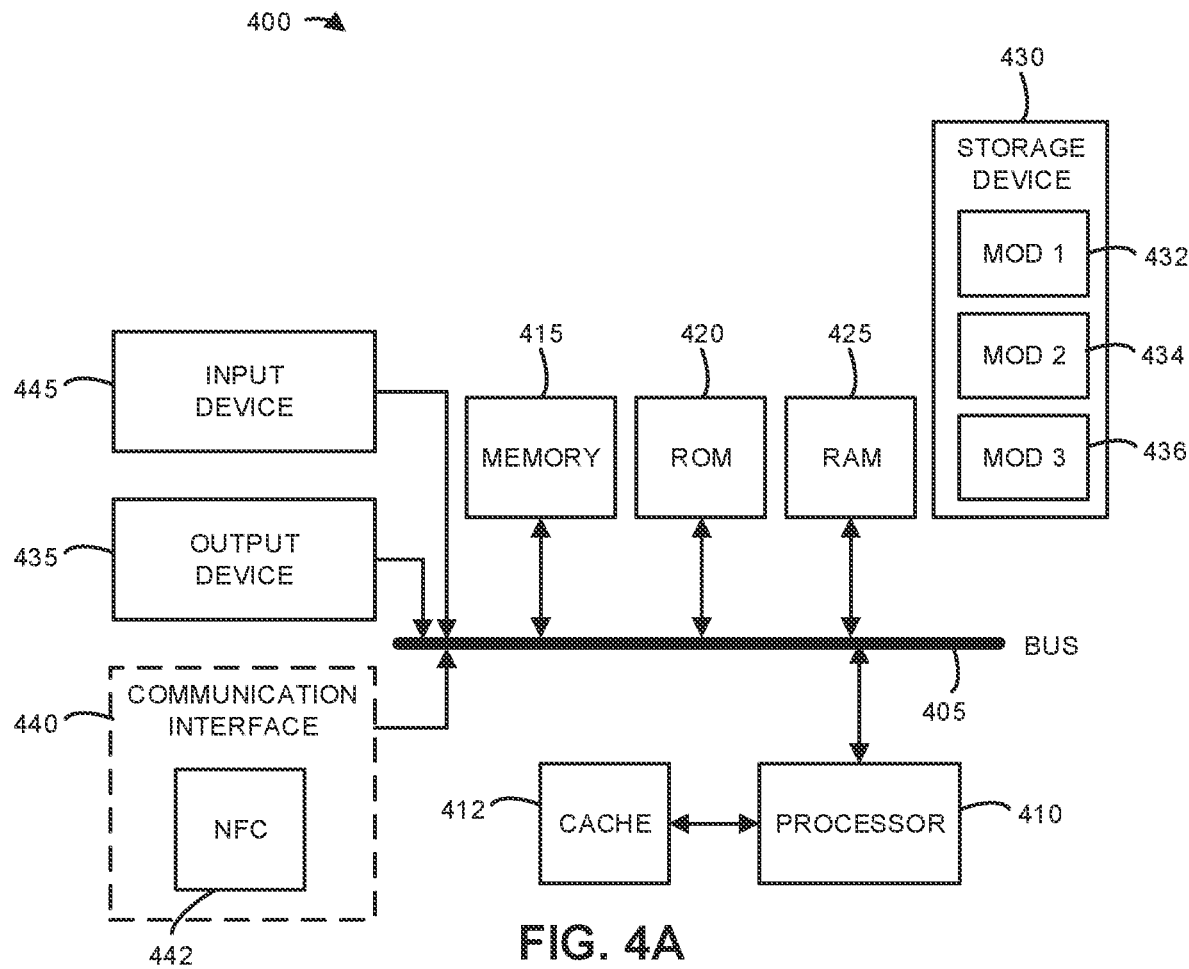
FIG. 4A and FIG. 4B illustrate exemplary possible system embodiments.
Figure 4B:
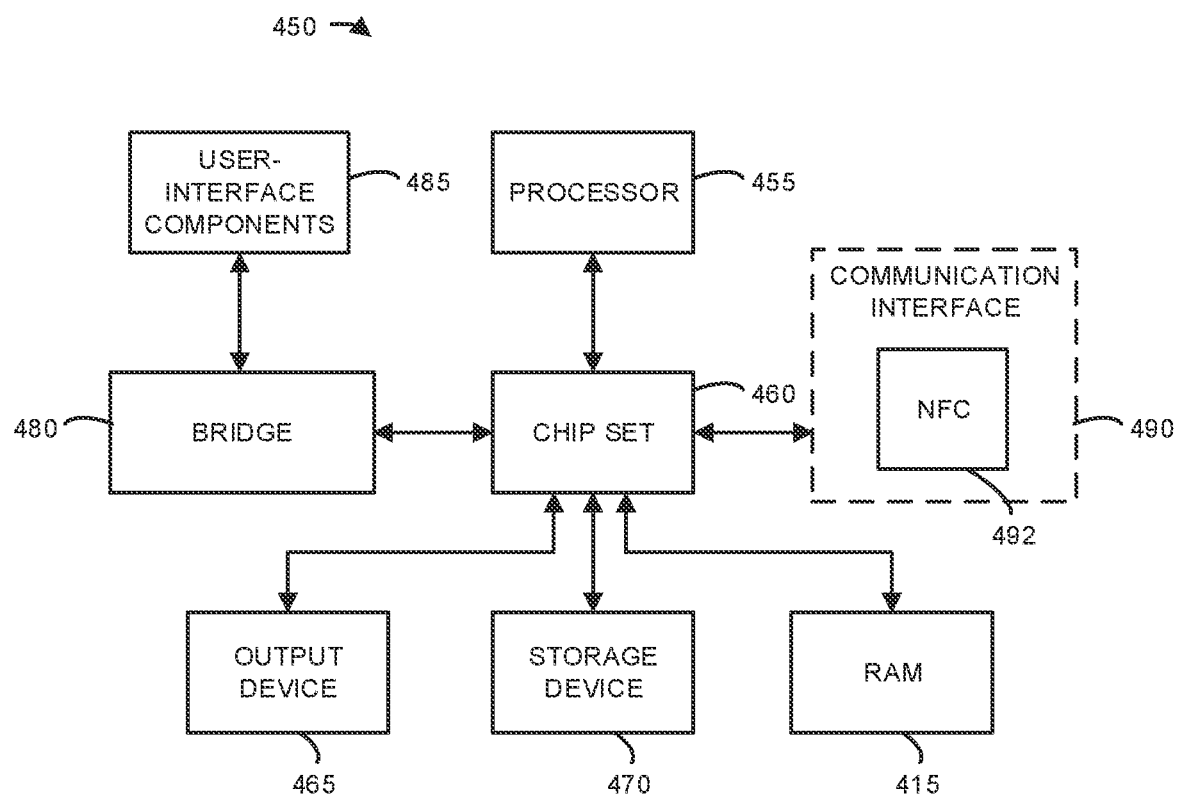

FIG. 4A and FIG. 4B illustrate examples of possible system embodiments. Persons of ordinary skill in the art will also readily appreciate that other system embodiments are possible.

FIG. 4A illustrates an example of a system-bus computing system architecture 400 in which the components of the system are in electrical communication with each other using a bus 405. In particular, system 400 may include a processing unit (CPU or processor) 410 and a system bus 405 that couples various system components including system memory 415, such as read-only memory (ROM) 420 and random-access memory (RAM) 425, to processor 410.

Moreover, system 400 can include a cache of high-speed memory connected directly with, in close proximity to, or integrated as part of processor 410. Furthermore, system 400 can copy data from memory 415 and/or storage device 430 to cache 412 for quick access by processor 410. In this way, cache 412 can provide a performance boost that avoids processor 410 delays while waiting for data. These and other modules can control or be configured to control processor 410 to perform various actions. Other system memory 415 may be available for use as well. Note that memory 415 can include multiple different types of memory with different performance characteristics. In addition, processor 410 can include any general purpose processor and a hardware module or software module, such as module 1 432, module 2 434, and module 3 436 stored in storage device 430, configured to control processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with computing device 400, an input device 445 can represent any number of input mechanisms, such as a microphone for speech, a touch-sensitive screen for gesture or graphical input, keyboard, mouse, motion input, speech and so forth. Moreover, an output device 435 can also be one or more of a number of output mechanisms known to those of skill in the art. In some instances, multimodal systems can enable a user to provide multiple types of input to communicate with computing device 400. Furthermore, communications interface 440, including NFC interface 442, can generally govern and manage the user input and system output. For example, via NFC interface 442, system 400 may receive a VAS command as part of a polling loop, where the VAS command includes payment terminal capabilities data that allows system 400 to determine whether the payment terminal supports VAS operation. There is no restriction on operating on any particular hardware arrangement and therefore the basic features here may easily be substituted for improved hardware or firmware arrangements as they are developed.

Storage device 430 may be a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 425, read-only memory (ROM) 420, and hybrids thereof.

Additionally, storage device 430 can include software modules 432, 434, 436 to control processor 410. Other hardware or software modules are contemplated. Note that storage device 430 can be connected to system bus 405. In one aspect, a hardware module that performs a particular function can include the software component stored in a computer-readable medium in connection with the necessary hardware components, such as processor 410, bus 405, display 435, and so forth, to carry out this and/or other functions.

FIG. 4B illustrates an example of a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user-interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. For example, via NFC interface 492, computer system 450 may receive a VAS command as part of a polling loop, where the VAS command includes payment terminal capabilities data that allows computer system 450 to determine whether the payment terminal supports VAS operation. Some applications of the methods for generating, displaying, and using the GUI disclosed herein can include receiving ordered datasets over the physical interface or may be generated by the machine itself, e.g., by processor 455, to analyze data stored in storage 470 or 475. Furthermore, the machine can receive inputs from a user via user-interface components 485 and may execute appropriate functions, such as browsing functions by interpreting these inputs using processor 455.

It can be appreciated that systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to the described embodiments, may include: magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method performed by a portable communication device, the method comprising:
    based on receiving a first wake-up command from a payment terminal, waiting, for a threshold period of time, to receive a value-added services (VAS) command from the payment terminal;
    based on receiving the VAS command within the threshold period of time:
        providing, to the payment terminal, a response to the VAS command to initiate a VAS protocol,
        receiving, from the payment terminal, a merchant identifier associated with a merchant,
        obtaining loyalty card information based on the merchant identifier, and
        providing, to the payment terminal, the loyalty card information to cause the payment terminal to perform a VAS transaction based on the loyalty card information; and
    based on receiving a second wake-up command from the payment terminal, providing payment card information to cause the payment terminal to perform a payment transaction using the payment card information.

2. The method of claim 1, wherein the first wake-up command comprises at least one Level 1 instruction and the VAS protocol comprises at least one Level 2 instruction.

3. The method of claim 2, wherein the VAS protocol is one of a plurality of protocols available as part of Level 2 instructions.

4. The method of claim 1, wherein the portable communication device and the payment terminal communicate using respective contactless interfaces.

5. The method of claim 1, wherein the VAS transaction entitles a user of the portable communication device to a free or discounted item.

6. The method of claim 1, wherein the portable communication device provides the loyalty card information to the payment terminal by at least:
    receiving, from the payment terminal, the merchant identifier for the merchant; and
    transmitting, to the payment terminal, the loyalty card information for the merchant associated with the merchant identifier.

7. The method of claim 1, further comprising, prior to transmitting the payment card information to the payment terminal:
    receiving, from the payment terminal, information about payment cards that are accepted by the payment terminal.

8. A non-transitory computer readable storage medium configured to store instructions that, when executed by a processor included in a portable communication device, cause the portable communication device to carry out steps that include:
    based on receiving a first wake-up command from a payment terminal, waiting, for a threshold period of time, to receive a value-added services (VAS) command from the payment terminal;
    based on receiving the VAS command within the threshold period of time:
        providing, to the payment terminal, a response to the VAS command to initiate a VAS protocol,
        receiving, from the payment terminal, a merchant identifier associated with a merchant,
        obtaining loyalty card information based on the merchant identifier, and
        providing, to the payment terminal, the loyalty card information to cause the payment terminal to perform a VAS transaction based on the loyalty card information; and
    based on receiving a second wake-up command from the payment terminal, providing payment card information to cause the payment terminal to perform a payment transaction using the payment card information.

9. The non-transitory computer readable storage medium of claim 8, wherein the first wake-up command comprises at least one Level 1 instruction and the VAS protocol comprises at least one Level 2 instruction.

10. The non-transitory computer readable storage medium of claim 9, wherein the VAS protocol is one of a plurality of protocols available as part of Level 2 instructions.

11. The non-transitory computer readable storage medium of claim 8, wherein the portable communication device and the payment terminal communicate using respective contactless interfaces.

12. The non-transitory computer readable storage medium of claim 8, wherein the VAS transaction entitles a user of the portable communication device to a free or discounted item.

13. The non-transitory computer readable storage medium of claim 8, wherein the portable communication device provides the loyalty card information to the payment terminal by at least:
    receiving, from the payment terminal, the merchant identifier for the merchant; and transmitting, to the payment terminal, the loyalty card information for the merchant associated with the merchant identifier.

14. The non-transitory computer readable storage medium of claim 8, wherein the steps further include, prior to transmitting the payment card information to the payment terminal:

receiving, from the payment terminal, information about payment cards that are accepted by the payment terminal.

15. A portable communication device, comprising:

at least one processor; and at least one memory storing instructions that, when executed by the at least one processor, cause the portable communication device to carry out steps that include:

based on receiving a first wake-up command from a payment terminal, waiting, for a threshold period of time, to receive a value-added services (VAS) command from the payment terminal;

based on receiving the VAS command within the threshold period of time:

providing, to the payment terminal, a response to the VAS command to initiate a VAS protocol, receiving, from the payment terminal, a merchant identifier associated with a merchant, obtaining loyalty card information based on the merchant identifier, and providing, to the payment terminal, the loyalty card information to cause the payment terminal to perform a VAS transaction based on the loyalty card information; and based on receiving a second wake-up command from the payment terminal, providing payment card information to cause the payment terminal to perform a payment transaction using the payment card information.

16. The portable communication device of claim 15, wherein the first wake-up command comprises at least one Level 1 instruction and the VAS protocol comprises at least one Level 2 instruction.

17. The portable communication device of claim 16, wherein the VAS protocol is one of a plurality of protocols available as part of Level 2 instructions.

18. The portable communication device of claim 15, wherein the portable communication device and the payment terminal communicate using respective contactless interfaces.

19. The portable communication device of claim 15, wherein the VAS transaction entitles a user of the portable communication device to a free or discounted item.

20. The portable communication device of claim 15, wherein the portable communication device provides the loyalty card information to the payment terminal by at least:

receiving, from the payment terminal, the merchant identifier for the merchant; and transmitting, to the payment terminal, the loyalty card information for the merchant associated with the merchant identifier.

* * * * *